(12) United States Patent
Chuang et al.

(10) Patent No.: US 10,347,252 B2
(45) Date of Patent: Jul. 9, 2019

(54) ELECTRONIC DEVICE WITH WAKE ON VOICE FUNCTION AND OPERATION METHOD THEREOF

(71) Applicant: REALTEK SEMICONDUCTOR CORP., Hsinchu (TW)

(72) Inventors: Tsung-Peng Chuang, Hsinchu County (TW); Chih-Chen Ku, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/936,018

(22) Filed: Mar. 26, 2018

(65) Prior Publication Data

US 2018/0322871 A1  Nov. 8, 2018

(30) Foreign Application Priority Data

May 2, 2017 (TW) .............................. 106114475 A

(51) Int. Cl.
| | |
|---|---|
| *G10L 15/00* | (2013.01) |
| *G10L 17/00* | (2013.01) |
| *G10L 15/22* | (2006.01) |
| *G10L 25/84* | (2013.01) |
| *G10L 15/08* | (2006.01) |
| *G10L 25/78* | (2013.01) |

(52) U.S. Cl.
CPC .............. *G10L 15/22* (2013.01); *G10L 15/08* (2013.01); *G10L 25/84* (2013.01); *G10L 25/78* (2013.01); *G10L 2015/088* (2013.01); *G10L 2015/223* (2013.01)

(58) Field of Classification Search
CPC ... G10L 15/08; G10L 15/22; G10L 2015/088; G10L 2015/223; G10L 25/78; G10L 25/84
USPC .................................................. 704/233, 246
See application file for complete search history.

(56) References Cited

U.S. PATENT DOCUMENTS

| | | | | |
|---|---|---|---|---|
| 9,043,211 | B2* | 5/2015 | Haiut | G06F 1/3265 |
| | | | | 704/251 |
| 9,942,678 | B1* | 4/2018 | Hartung | H04R 29/007 |
| 2005/0165609 | A1* | 7/2005 | Zuberec | G10L 15/22 |
| | | | | 704/270 |
| 2005/0237160 | A1* | 10/2005 | Nolan | G06K 19/0705 |
| | | | | 340/10.33 |
| 2008/0112265 | A1* | 5/2008 | Urbano | G01S 7/52096 |
| | | | | 367/87 |

(Continued)

FOREIGN PATENT DOCUMENTS

CN   106448663 A   2/2017

*Primary Examiner* — Khai N. Nguyen
(74) *Attorney, Agent, or Firm* — Li & Cai Intellectual Property (USA) Office

(57) ABSTRACT

The present disclosure illustrates an electronic device with wake on voice function and an operating method thereof. The electronic device detects an audio signal in analog form by an additional pre-signal detector, and the pre-signal detector wakes up an analog-to-digital converter and a human voice detector when the audio signal in analog form is determined to satisfy a predetermined condition. When a host system of the electronic device enters into a sleep mode from an operation mode, the analog-to-digital converter and the human voice detector enter into a sleep mode together.

20 Claims, 7 Drawing Sheets

(56) References Cited

U.S. PATENT DOCUMENTS

| | | | |
|---|---|---|---|
| 2014/0214416 A1* | 7/2014 | Yue | G10L 15/083 |
| | | | 704/231 |
| 2014/0274203 A1* | 9/2014 | Ganong, III | H04W 52/0251 |
| | | | 455/556.1 |
| 2014/0278443 A1* | 9/2014 | Gunn | G06F 3/0488 |
| | | | 704/275 |
| 2014/0337036 A1* | 11/2014 | Haiut | G06F 1/3265 |
| | | | 704/275 |
| 2016/0189706 A1* | 6/2016 | Zopf | G10L 15/063 |
| | | | 713/320 |
| 2017/0194001 A1* | 7/2017 | Mortensen | G10L 15/02 |
| 2018/0005633 A1* | 1/2018 | Bocklet | G10L 17/04 |
| 2018/0182388 A1* | 6/2018 | Bocklet | G10L 15/22 |
| 2018/0322871 A1* | 11/2018 | Chuang | G10L 15/22 |

\* cited by examiner

ELECTRONIC DEVICE WITH WAKE ON VOICE FUNCTION AND OPERATION METHOD THEREOF

BACKGROUND OF THE INVENTION

1. Field of the Invention

The present disclosure relates to an electronic device and an operation method thereof; more particularly, to an electronic device with a wake on voice function and an operation method thereof.

2. Description of Related Art

With the development of technology, wake on voice function has been widely used on electronic devices, devices small as mobile phones or large as appliances can all be equipped with wake on voice function. The so-called wake on voice function allows a user to wake up an electronic device in a sleep mode (or sleep status) by human voice, so as to enable the electronic device to be back in an operation mode. Referring to FIG. 1 for example, FIG. 1 is a schematic view illustrating the functional block of a conventional electronic device with wake on voice function. As shown in FIG. 1, the electronic device 1 mainly includes a microphone Mic, a microphone pre-amplifier 100, an analog-to-digital convertor (ADC) 120, a human voice detector 140, a digital signal processor (DSP) 160 and a host system HS.

When the electronic device 1 enters into a sleep mode (i.e., the host system HS enters into sleep mode), the microphone Mic would receive sound from the ambience, the ambient sound (not shown in the figure) would be amplified by the microphone pre-amplifier 100 and transformed into a digital signal (not shown in the figure) by the DSP 160, and then the human voice detector 140 would determine if the ambient sound is a human voice. The human voice detector 140 would not wake up the DSP 160 and the host system HS if the ambient sound is determined not to be a human voice; while human voice detector 140 would wake up the DSP 160 and the host system HS if the ambient sound is a human voice, for the DSP 160 to further determine if the human voice satisfies a predetermined key-phrase.

In the case the ambient sound is determined not to be a human voice, the DSP 160 would return to the sleep mode automatically and waits for the next wakeup. Conversely, the DSP 160 would wake up the host system HS, so as to enable the electronic device to be back in the operation mode. As shown in FIG. 1, in order not to miss the processing of any sound for the DSP 160 to run speech recognition, the microphone Mic, the microphone pre-amplifier 100, the ADC 120 and the human voice detector 140 should always be turned on (always-on status), which leads to extra power consumption. Hence, how to improve the power consumption when the electronic device 1 is under sleep mode becomes a critical issue to be resolved.

SUMMARY OF THE INVENTION

In an embodiment of the present disclosure, an electronic device with a wake on voice function is provided. The electronic device includes a host system, a microphone, a first microphone pre-amplifier, a pre-signal detector and a key-phrase determination circuit. The microphone is configured to receive an ambient sound, and to output the ambient sound as an ambient audio signal. The first microphone is configured to receive and amplify the ambient audio signal to generate an analog audio signal. The pre-signal detector is configured to receive and determine if the analog audio signal satisfies a predetermined condition, and to output a first wake-up command when the analog audio signal is determined to satisfy the predetermined condition. The key-phrase determination circuit is woken up to receive and process the analog audio signal so as to determine if the ambient sound satisfies a predetermined key-phrase, and when the ambient sound is determined to satisfy a predetermined key-phrase, the key-phrase determination circuit outputs a host wake-up command to wake up the host system from the sleep mode.

In another embodiment of the present disclosure, an operation method for an electronic device with a wake on voice function is provided. The electronic device is based on that in the previous described embodiment. The operation method includes steps as follow. Firstly, receives an ambient sound, by the microphone, and outputs the ambient sound as an ambient audio signal. Secondly, receives the ambient sound, by the first microphone pre-amplifier, to generate an analog audio signal. Then, receives the analog audio signal, by the pre-signal detector, to determine if the analog audio signal satisfies a predetermined condition, and when the host system enters into a sleep mode and if the analog audio signal is determined to satisfy the predetermined condition, the pre-signal detector outputs a first wake-up command to wake up the key-phrase determination circuit. Finally, the key-phrase determination circuit is woken up to receive and process the analog audio signal so as to determine if the ambient sound satisfies a predetermined key-phrase, and when the ambient sound is determined to satisfy a predetermined key-phrase, the key-phrase determination circuit outputs a host wake-up command to wake up the host system from the sleep mode.

Preferably, the key-phrase determination circuit may include an analog-to-digital converter (ADC), a human voice detector and a digital signal processor (DSP). After the host system enters into the sleep mode, when the pre-signal detector outputs the first wake-up command, the ADC is woken up to transform the analog audio signal into a digital audio signal, the human voice detector is woken up to determine if the digital audio signal satisfies a human voice, and when the digital audio signal is determined to satisfy the human voice, the human voice detector outputs a second wake-up command. Then, the DSP is woken up to determine if the human voice satisfies the predetermined key-phrase, and when the human voice is determined to satisfy the predetermined key-phrase, the DSP outputs the host wake-up command to wake up the host system from the sleep mode. Therefore, when the host system of the electronic device enters into the sleep mode from an operation mode, the ADC, the human voice detector and the DSP enter into the sleep mode all together.

In sum, the electronic device with a wake on voice function and the operation method thereof provided in the embodiments of the present disclosure are different from the conventional art, and the differences are resulted from by utilizing additionally-added pre-signal detector to detect the analog audio signal to reach a faster and preliminary voice recognition result. Moreover, when the analog audio signal satisfies a predetermined condition, the pre-signal detector would wake the ADC and the human voice detector up, enduring the ADC, the human detector and the DSP would be entering into the sleep mode together when the host system of the electronic device enters into the sleep mode from the operation mode, which effectively improves of up to 1 time the power consumption.

In order to further the understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

Figure 2:
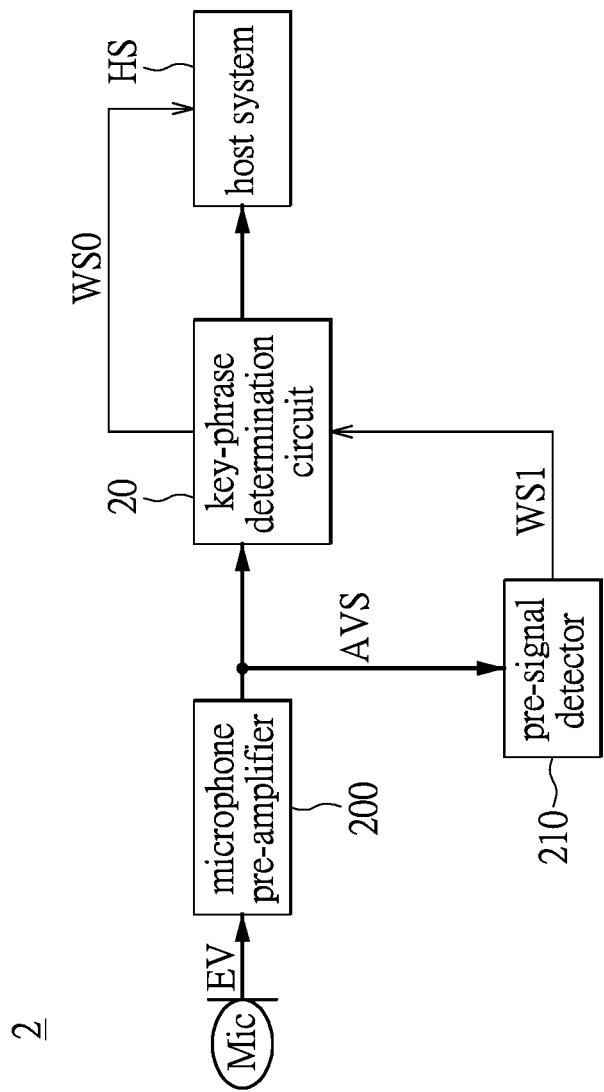
FIG. 2 is a schematic view illustrating the functional block of an electronic device with a wake on voice function according to an embodiment of the present disclosure.

Reference is made to FIG. 2, which is a schematic view illustrating the functional block of an electronic device with a wake on voice function according to an embodiment of the present disclosure. In the present embodiment, the electronic device 2 includes a host system HS, a microphone Mic, a microphone pre-amplifier 200, a pre-signal detector 210 and a key-phrase determination circuit 20. The host system HS, the microphone pre-amplifier 200, the pre-signal detector 210 and the key-phrase determination circuit 20 can be implemented purely by hardware circuit, or be implemented by hardware circuit with firm elements or software. Conclusively, the implementation of the electronic device 2 is not limited in the present disclosure. Additionally, the elements stated above can be installed integrally or separately and there should be no limitations imposed thereupon.

To be more specific, the Mic is configured to receive an ambient sound (not shown in the figure) from the space where the electronic device 2 is in, and to output the ambient sound as an ambient audio signal EV. The microphone pre-amplifier 200 couples with the Mic, and is configured to receive and to amplify the ambient audio signal EV to generate an analog audio signal AVS. As shown in FIG. 2, the operational theories of the Mic and the microphone pre-amplifier 200 are well-known to those with ordinary skill in the relevant art, and thus the detail descriptions thereof would be skipped for the sake of brevity. Moreover, the pre-signal detector 210 couples with the microphone pre-amplifier 200, and the key-phrase determination circuit 20 couples with the pre-signal detector 210 and the host system HS.

The pre-signal detector 210 is configured to receive and to determine if the analog audio signal AVS satisfies a predetermined condition (not shown in the figure), and when the host system HS enters into a sleep mode, when the analog audio signal AVS is determined to satisfy the predetermined condition, the pre-signal detector 210 outputs a first wake-up command WS1 to wake up the key-phrase determination circuit 20. The key-phrase determination circuit 20 is woken up to receive and process the analog audio signal AVS so as to determine if the ambient sound satisfies a predetermined key-phrase, to determine if the ambient sound satisfies a predetermined key-phrase (not shown in the figure), and when the ambient sound is determined to satisfy the predetermined key-phrase, the key-phrase determination circuit 20 outputs a host wake-up command WS0 to wake up the host system HS from the sleep mode to be back to a regular operation mode.

Figure 3A:
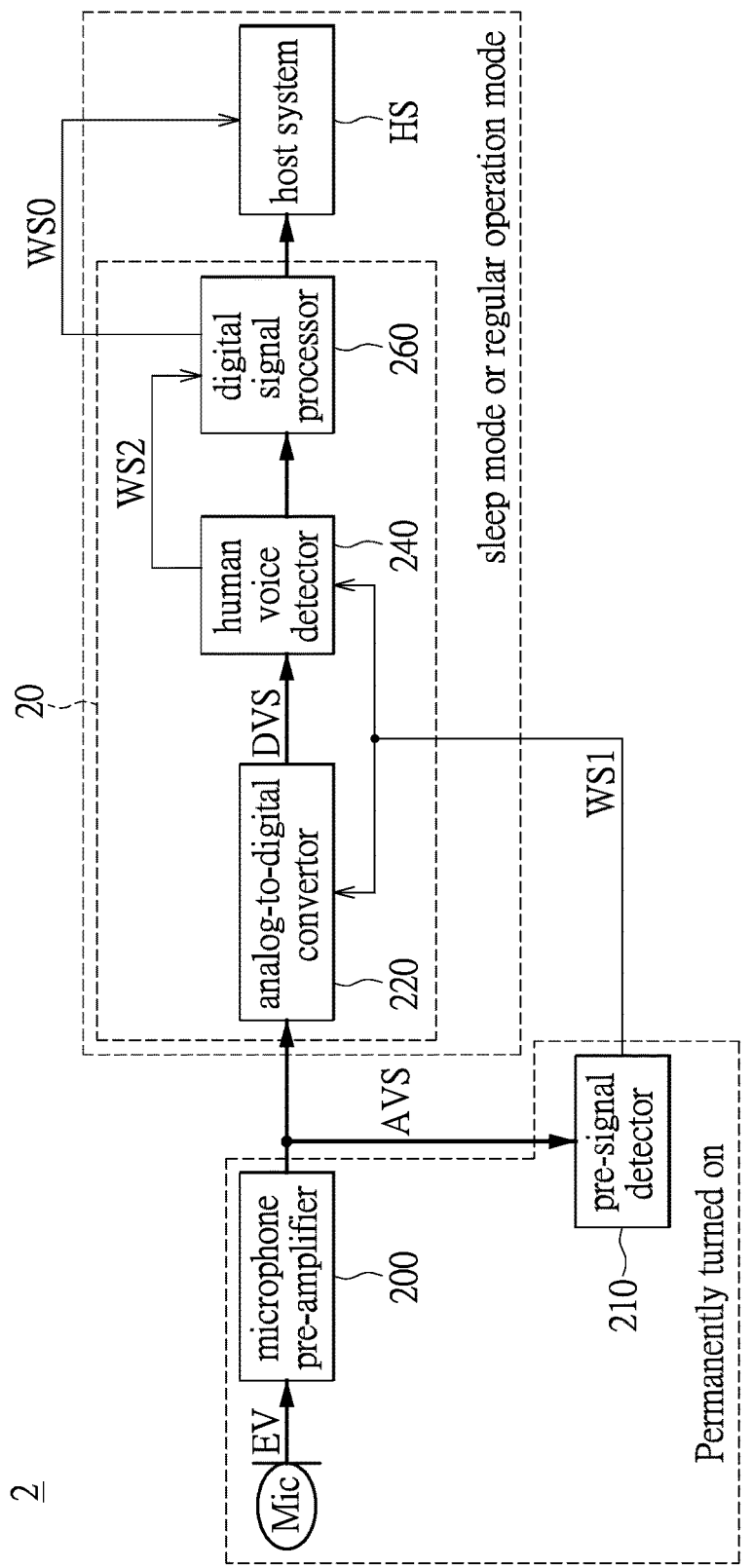
FIG. 3A is a schematic view illustrating the functional block of a key-phrase determination circuit of the electronic device with a wake on voice function in FIG. 2 according to an embodiment of the present disclosure.

What should be noticed is, the predetermined condition could be, but not limited to, set up according to the predetermined key-phrase. In order to further describe the implementation details of the key-phrase determination circuit 20, one of implementations is thus provided in the present disclosure. Referring to FIG. 3A collectively, a schematic view illustrating the functional block of a key-phrase determination circuit of the electronic device with a wake on voice function in FIG. 2 according to an embodiment of the present disclosure is shown. It is noticed that the implementation to be described in the following is also an example, thus should not limit the scope of the present disclosure. In other words, the implementation of the key-phrase determination circuit 20 is not limited in the present disclosure, and people with ordinary skill in the relevant art can have different designs according to practical demands or applications.

In the embodiment as shown in FIG. 3A, the key-phrase determination circuit 20 may include an analog-to-digital converter 220, a human voice detector 240 and a digital signal processor 260. The operational theories of the analog-to-digital converter 220, the human voice detector 240 and the digital signal processor 260 are well-known to those with ordinary skill in the relevant art, and thus the detail descriptions thereof would be skipped for the sake of brevity. Apparently, as compared with the electronic device 1 shown in FIG. 1, the electronic device 2 further includes a pre-signal detector 21. In the present embodiment, the pre-signal detector 210 may be a detector circuit with simple structure, and it is mainly used to detect and to process the analog audio signal AVS.

Since the detection circuit for processing analog signal may be implemented by just a few simulation circuit elements (e.g., operational amplifier), the power consumption for the pre-signal detector 210 is usually small. Therefore in practice, the pre-signal detector 210 can always be turned on (always-on status), since the power consumption is not of concern. Furthermore, since analog signal processing is far more easier and faster than digital signal processing is, the additionally-added pre-signal detector 210 can be used to detect the analog audio signal AVS to generate a faster and preliminary voice recognition result.

Figure 1:
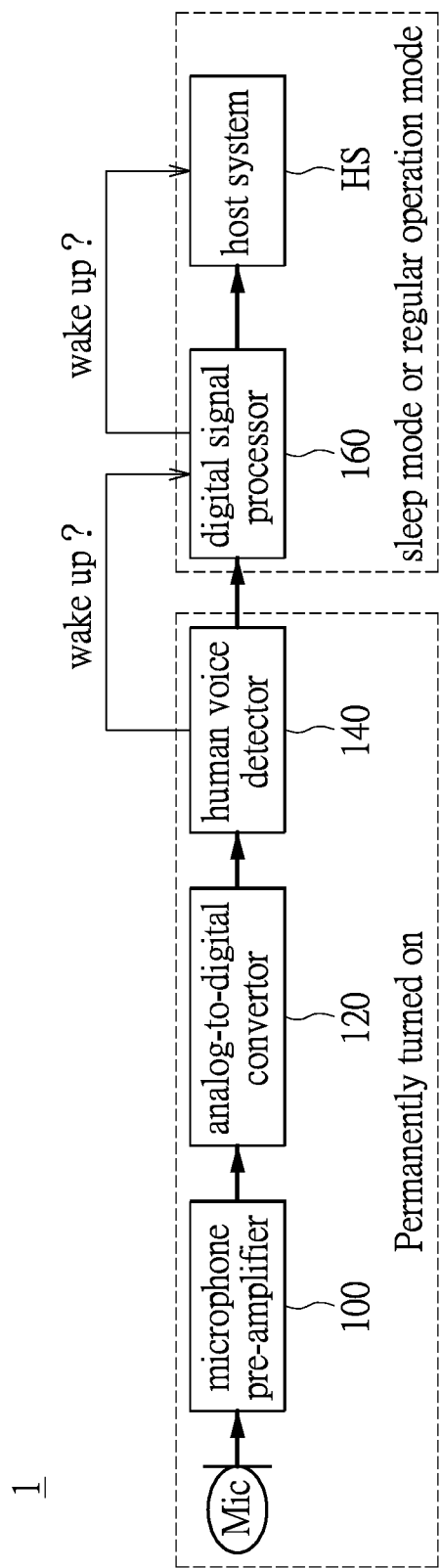
FIG. 1 is a schematic view illustrating the functional block of a conventional electronic device with wake on voice function.

To be more specific, when the electronic device 2 is in the sleep mode (i.e., the host system HS enters into the sleep mode), and when the pre-signal detector 210 determines that the analog audio signal AVS satisfies a predetermined condition (not shown in the figure), the pre-signal detector 210 would output a first wake-up command WS1 to wake up the analog-to-digital 220 and the human voice detector 240 in the key-phrase determination circuit 20. Therefore, by the above description, people with ordinary skill in the art can understand that, for the conventional art as shown in FIG. 1, when the host system HS enters into a sleep mode from a regular operation mode, only the digital signal process 160 of the electronic 1 would enter into the sleep mode correspondingly. However, in the present disclosure, when the host system HS enters into a sleep mode from a regular operation mode, the analog-to-digital converter 220, the human voice detector 240 and the digital signal processor 260 would all together enter into the sleep mode, and thus the electronic device 2 of the present embodiment can effectively improve of up to 1 time the power consumption.

That is to say, when the electronic device 2 is in the sleep mode, only the Mic, the microphone pre-amplifier 200 and the pre-signal detector 210 would be left turned on in the present embodiment, and thus the power consumption of the entire electronic device 2 can be further reduced. To be more specific, as shown in FIG. 3A, after the host system HS enters into the sleep mode, the analog-to-digital converter 220 would be woken up to transform the analog audio signal EV into a digital audio signal DVS, and the human voice detector 240 would also be woken up to determine if the digital audio signal DVS satisfies a human voice (not shown in the figure).

When the digital audio signal DVS is determined to satisfy a human voice, the human voice detector 240 would output a second wake-up command WS2 to wake the digital signal processor 260 up. As described previously, it should be understood that after the host system HS enters into the sleep mode, and under the situation that the human voice detector 240 and the analog-to-digital converter 220 are woken up, when the digital audio signal DVS is determined not to satisfy the human voice, the human voice detector 240 and the analog-to-digital converter 220 would return back to the sleep mode and wait for a next wakeup.

Similarly, after the host system HS enters into the sleep mode, and when the human voice detector 240 outputs the second wake-up command WS2, the digital signal processor 260 would be woken up to determine if the human voice satisfies the predetermined key-phrase (not shown in the figure), and when human voice is determined to satisfy the predetermined key-phrase, the digital signal processor 260 outputs the host wake-up command WS0 to wake up the host system HS from the sleep mode. It should be understood that, after the host system HS enters into the sleep mode, and under the situation that the digital signal processor 260, the human voice detector 240 and the analog-to-digital converter 220 are woken up, when the human voice is determined not to satisfy the predetermined key-phrase, the DSP, the human voice detector and the analog-to-digital converter 220 would return back to the sleep mode and wait for a next wakeup. The relevant descriptions are skipped for the sake of brevity.

Theoretically, analog signal means those signals with mathematical form in continuous form in time domain, and thus analog signal can be expressed directly by some physical patterns. Therefore in the present embodiment, the so-called "determining if the analog audio signal AVS satisfies a predetermined condition" means to determine if the analog audio signal AVS satisfies a predetermined pattern, and the predetermined pattern may be set up according to the physical properties of human voice, or according to the physical properties of the predetermined key-phrase. However, since analog audio signal AVS can be easily distorted by noise, the analog audio signal AVS does not need to be more accurate than the digital audio signal DVS. Hence, when the pre-signal detector 210 determines the analog audio signal AVS to satisfy a predetermined pattern, the pre-signal detector 210 can wake up the analog-to-digital converter 220 and the human voice detector 240, to run more accurate voice recognition.

In addition, quantum errors do not exist in the analog audio signal AVS, so the analog audio signal AVS can most describe the real value of the ambient sound. Therefore, in the present embodiment, the so-called "determining if the analog audio signal AVS satisfies a predetermined condition" means if an amplitude, a period or a frequency of the analog audio signal AVS is greater than a corresponding threshold. For example, the frequencies of human voice fall within the range from 500 Hz to 2000 Hz. Therefore, when the pre-signal detector 210 determines the frequency of the analog audio signal AVS to be greater than 500 Hz (i.e., the threshold the frequency corresponds to is 500 Hz), the pre-signal detector 210 can preliminarily determine that the ambient sound may contain human voice, further the pre-signal detector 210 can wake up the analog-to-digital converter 220 and the human voice detector 240, to run more accurate voice recognition. In another embodiment, the pre-signal detector 210 determines if the amplitude and time duration of the analog audio signal AVS satisfy a range the predetermined key-phrase corresponds to, if yes, the ambient sound may be the predetermined key-phrase is able to be determined. In sum, the above addressed implementations should not limit the scope of the present disclosure, and people with ordinary skill in the relevant art can have different designs according to practical demands or applications.

Figure 3B:
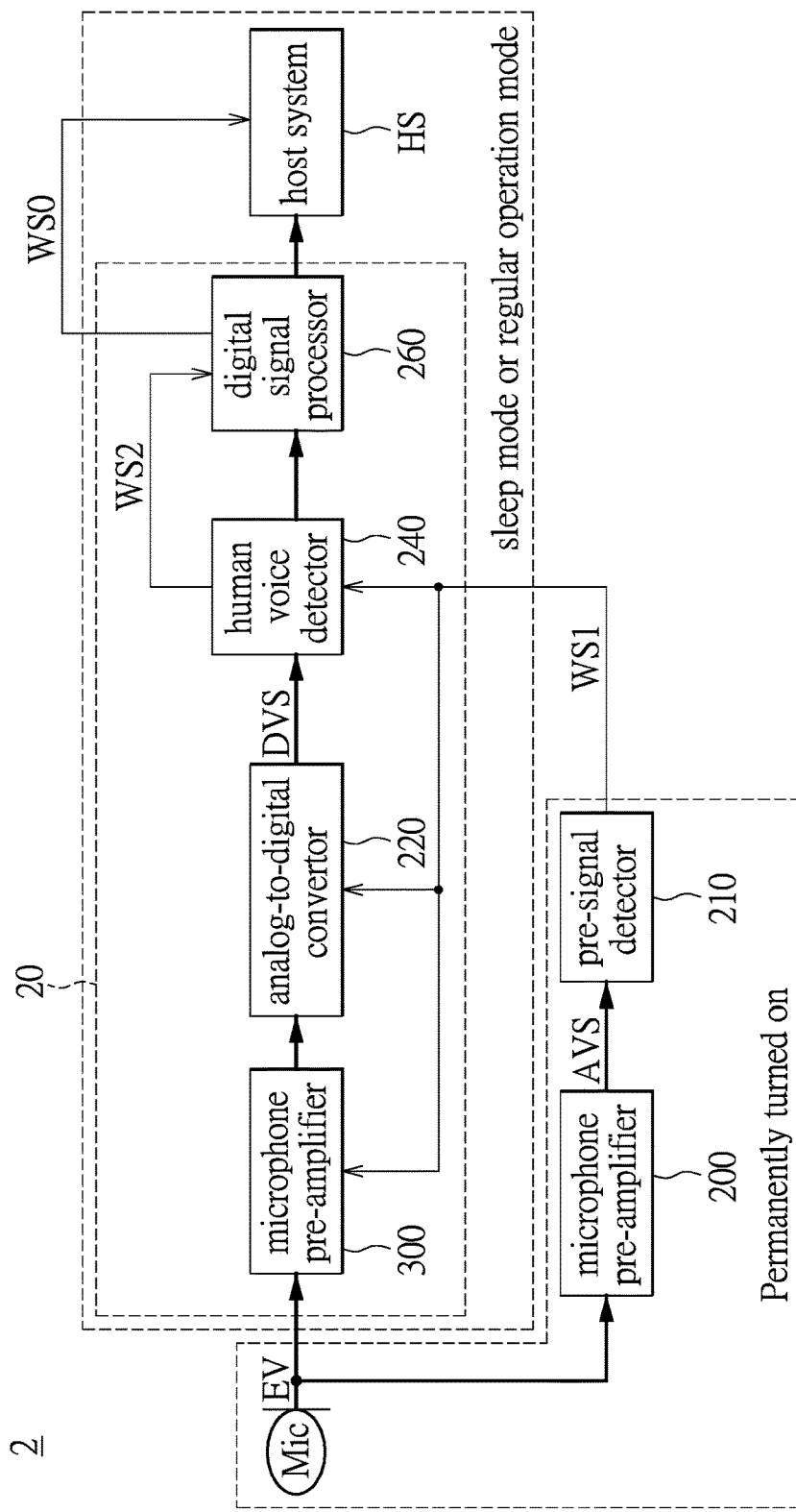
FIG. 3B is a schematic view illustrating the functional block of a key-phrase determination circuit of the electronic device with a wake on voice function in FIG. 2 according to another embodiment of the present disclosure.

It should be understood that, the microphone pre-amplifier 200 shown in FIG. 3A can be deemed as the microphone pre-amplifier 100 shown in FIG. 1, but no limitation should be imposed. For example, with FIG. 3B referred to collectively, FIG. 3B is a schematic view illustrating the functional block of a key-phrase determination circuit of the electronic device with a wake on voice function in FIG. 2 according to another embodiment of the present disclosure. Elements in FIG. 3B that are the same as those in FIG. 3A are labeled with the same element number, and the relevant descriptions are skipped for the sake of brevity.

It is noticed that, as compared to the functional block of FIG. 3A, the key-phrase determination circuit 20 of FIG. 3B further includes a microphone pre-amplifier 300. The microphone pre-amplifier 300 couples to in between the Mic, the pre-signal detector 210 and the analog-to-digital converter 220.

In the embodiment as shown in FIG. 3B, after the host system HS enters into the sleep mode, when the pre-signal detector 210 outputs the first wake-up command WS1, the microphone pre-amplifier 300 is woken up to amplify the ambient audio signal EV, and to output the analog audio signal EV to the analog-to-digital converter 220, so as to allow the analog-to-digital converter 220 and the human voice detector 240 to proceed with the following functions. Therefore, by the teaching from above, people with ordinary skill in the relevant art can understand that when the host system HS enters into the sleep mode from the regular operation mode, the microphone pre-amplifier 300 would also enter into the sleep mode together.

Similarly, after the host system enters into the sleep mode, and under the situation that the microphone pre-amplifier 300, the human voice detector 240 and the analog-to-digital converter 200 are woken up, when the digital audio signal DVS is determined not to satisfy the human voice, the microphone pre-amplifier 300 returns back to the sleep mode and waits for a next wakeup. The detailed descriptions are the same as described in the previous embodiment, and are skipped for the sake of brevity.

It is noticed that, the implementation for the microphone pre-amplifier 300 is not limited in the present disclosure, and people with ordinary skill in the relevant art can have different designs according to practical demands or applications. In the present embodiment, power consumption of the microphone pre-amplifier 300 when under operation is greater than power consumption of the microphone pre-amplifier 200 when under operation. Thus, by the teaching from above, in the present embodiment, microphone pre-amplifiers with lower power consumption (e.g., microphone pre-amplifier 200) are used to roughly amplify the ambient audio signal EV, to generate analog audio signal AVS, and when the pre-signal detector 210 determines the analog audio signal AVS to satisfy the predetermined condition, then the pre-signal detector 210 wakes the microphone pre-amplifier 300 with high power consumption to completely amplify the ambient audio signal EV.

Therefore, as compared with the electronic device 2 in FIG. 3A, the electronic device 2 in FIG. 3B can further save more power consumed by one stage of circuit element. Conclusively, the above addressed implementations are not limited in the present disclosure, and people with ordinary skill in the relevant art can have different designs according to practical demands or applications.

Figure 4:
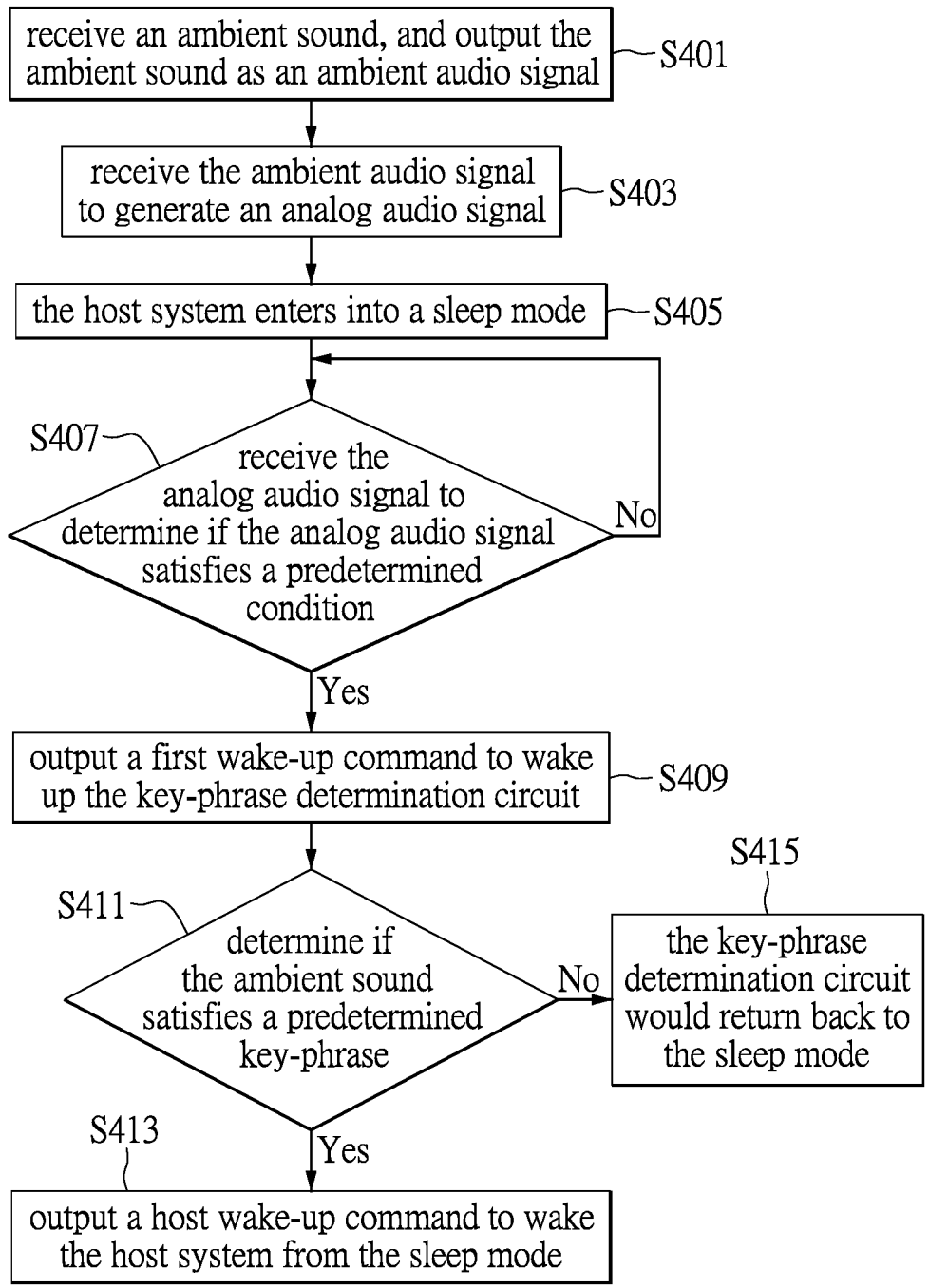
FIG. 4 is a flowchart illustrating an operation method for an electronic device with a wake on voice function according to an embodiment of the present disclosure.

In order to further explicate the operation of the electronic device 2, an operation method thereof is also provided in the present disclosure. Referring to FIG. 4, FIG. 4 is a flowchart illustrating an operation method for an electronic device with a wake on voice function according to an embodiment of the present disclosure. The operation method can be operated in the electronic device 2 shown in FIG. 2, and thus FIG. 2 is referred to together for better understanding. Repeated descriptions would be skipped for the sake for brevity.

In step S401, receives an ambient sound, by a microphone, and outputs the ambient sound as an ambient audio signal. Next, in step S403, receives the ambient sound, by a first microphone pre-amplifier, to generate an analog audio signal. In step S405, after the host system enters into a sleep mode, the operation method proceeds to step S407; and in S407, receives the analog audio signal, by a pre-signal detector, to determine if the analog audio signal satisfies a predetermined condition, and proceeds to step S409 if the analog audio signal satisfies the predetermined condition.

In step S409, the pre-signal detector outputs a first wake-up command to wake the key-phrase determination circuit. After that, in step S411, the key-phrase determination circuit is woken up to receive and process the analog audio signal, to determine if the ambient sound satisfies a predetermined key-phrase, and proceeds to step S413 if the ambient sound is determined to satisfy the predetermined key-phrase. In step S413, the key-phrase determination circuit outputs a host wake-up command to wake the host system from the sleep mode. Similarly, when the ambient sound is determined not to satisfy the predetermined key-phrase, the method proceeds to step S415 and in this step, the key-phrase determination circuit would return back to the sleep mode and wait for a next wakeup. What should be re-emphasized is that the predetermined condition in the present disclosure may be set up according but not limited to, for example, the predetermined key-phrase.

Figure 5:
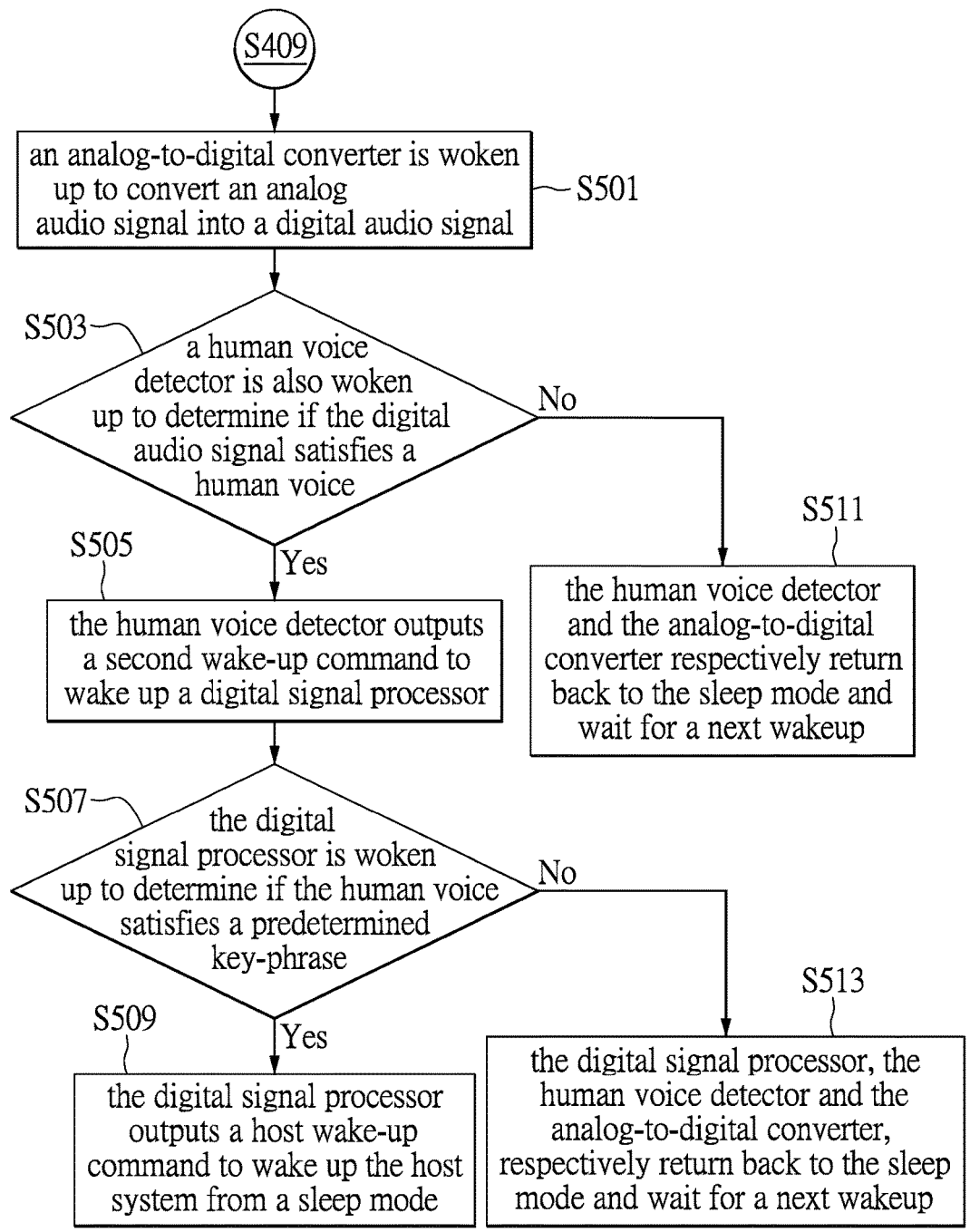
FIG. 5 is a flowchart illustrating steps S411-S415 of an embodiment the operation method in FIG. 4 is operated under.

In order to further explain the detailed implementations of the key-phrase determination circuit executing steps S411-S415, an embodiment thereof is further provided in the present disclosure. Reference is made to FIG. 5, which is a flowchart illustrating steps S411-S415 of an embodiment the operation method in FIG. 4 is operated under. The operation method in FIG. 2 can be operated on the electronic device 2 as shown in FIG. 3A, and thus FIG. 3A is referred to collectively for better understanding. Elements in FIG. 5 that are the same as those in FIG. 4 are labeled with the same element number, and the relevant descriptions are skipped for the sake of brevity.

In the embodiment of FIG. 5, steps S411-S415 may further include steps S501-S513. At first, in step S501, an analog-to-digital converter is woken up to convert an analog audio signal into a digital audio signal. After that and in step S503, a human voice detector is also woken up to determine if the digital audio signal satisfies a human voice, and step S505 would be proceeded if the digital audio signal is determined to satisfy the human voice. In step S505, the human voice detector outputs a second wake-up command to wake up a digital signal processor. And then in step S507, the digital signal processor is woken up to determine if the human voice satisfies a predetermined key-phrase, and step S509 would be proceeded if the human voice is determined to satisfy the predetermined key-phrase. In step S509, the digital signal processor outputs a host wake-up command to wake the host system up form a sleep mode.

Similarly, in step S503, if the digital audio signal is determined not to satisfy the human voice, the operation method flows to step S511. In step S511, the human voice detector and the analog-to-digital, respectively return back to the sleep mode and wait for a next wakeup. It can be seen that, in step S507, if the human voice is determined not satisfying the predetermined key-phrase, the operation method flows to step S513. In step S513, the digital signal processor, the human voice detector and the analog-to-digital converter, respectively return back to the sleep mode and wait for a next wakeup.

People with ordinary skill in the art may understand form the above teachings that, when the host system as shown in FIG. 3A enters into the sleep mode from a regular operation mode, the analog-to-digital converter, the human voice detector and the digital signal processor of the present embodiment, all enter into the sleep mode together.

Figure 6:
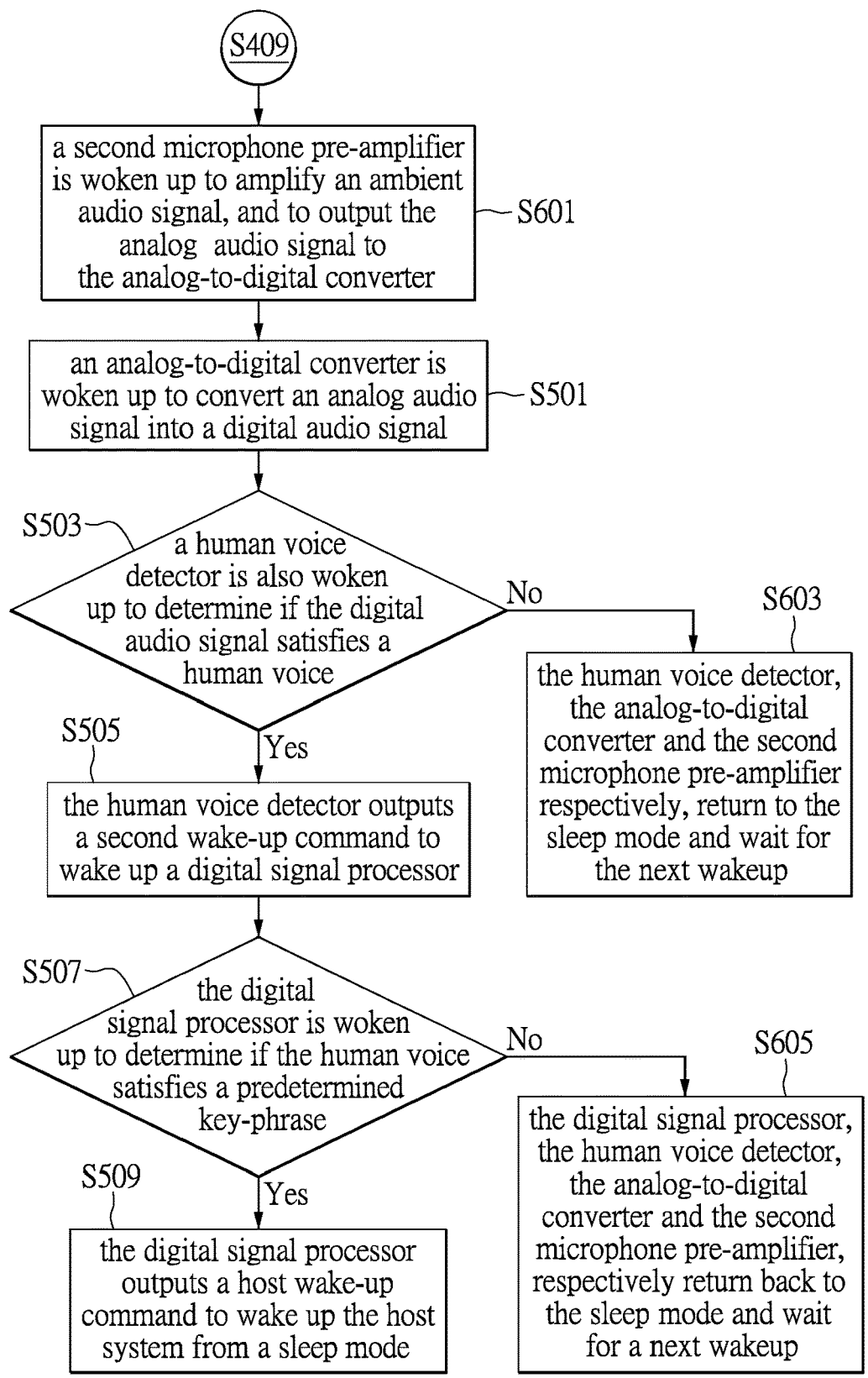
FIG. 6 is a flowchart illustrating steps S411-S415 of another embodiment the operation method in FIG. 4 is operated under.

Reference is next made to FIG. 6, which is a flowchart illustrating steps S411-S415 of another embodiment the operation method in FIG. 4 is operated under. The operation method illustrated by the embodiment of FIG. 6 can be operated on the electronic device 2 of FIG. 3B, and thus FIG. 3B is referred to together for better understanding. Elements in FIG. 6 that are the same as those in FIG. 4 are labeled with the same element number, and the relevant descriptions are skipped for the sake of brevity.

In the embodiment as shown in FIG. 6, steps S411-S415 can further include S601, S501-S519 and S603-S605. In step S601, a second microphone pre-amplifier is woken up to amplify an ambient audio signal, and to output the analog audio signal to the analog-to-digital converter. Moreover, in step S503, when the digital audio signal is determined not to satisfy the human voice, the operation method flows to step S603. In step S603, the human voice detector, the analog-to-digital converter and the second microphone pre-amplifier respectively, return to the sleep mode and wait for the next wakeup. Similarly, in step S507, if the human voice is determined not to satisfy the predetermined key-phrase, the operation method flows to step S605. In step S605, the digital signal processor, the human voice detector, the analog-to-digital converter and the second microphone pre-amplifier, respectively return back to the sleep mode and wait for a next wakeup.

When the host system as shown in FIG. 3B enters into the sleep mode from a regular operation mode, the analog-to-digital converter, the human voice detector, the digital signal processor and the second microphone pre-amplifier of the present embodiment, all enter into the sleep mode together. What should be noticed is, the power consumption of the second microphone pre-amplifier when under operation is greater than the power consumption of the first microphone pre-amplifier when under operation. People with ordinary skill in the art may understand form the above teachings that, before step S409 is executed, more power consumed by one stage of circuit element can be saved.

In sum, the electronic device with a wake on voice function and the operation method thereof provided in the embodiments of the present disclosure are different from the conventional art, and the differences are resulted from by utilizing additionally-added pre-signal detector to detect the analog audio signal to reach a faster and preliminary voice recognition result. Moreover, when the analog audio signal satisfies a predetermined condition, the pre-signal detector would wake up the analog-to-digital converter and the human voice detector, enduring the analog-to-digital converter, the human detector and the digital signal processor would be entering into the sleep mode together when the host system of the electronic device enters into the sleep mode from the operation mode, which effectively improves of up to 1 time the power consumption.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An electronic device with a wake on voice function, comprising:
    a host system;
    a microphone, configured to receive an ambient sound, and to output the ambient sound as an ambient audio signal;
    a first microphone pre-amplifier coupled with the microphone, configured to receive and amplify the ambient audio signal to generate an analog audio signal;
    a pre-signal detector coupled with the first microphone pre-amplifier, configured to receive and determine if the analog audio signal satisfies a predetermined condition, and to output a first wake-up command when the analog audio signal is determined to satisfy the predetermined condition; and
    a key-phrase determination circuit coupled with the pre-signal detector and the host system, wherein after the host system enters into a sleep mode, when the pre-signal detector outputs the first wake-up command, the key-phrase determination circuit is woken up to receive and process the analog audio signal so as to determine if the ambient sound satisfies a predetermined key-phrase, and when the ambient sound is determined to satisfy the predetermined key-phrase, the key-phrase determination circuit outputs a host wake-up command to wake up the host system from the sleep mode.

2. The electronic device according to claim 1, wherein the key-phrase determination circuit further includes:
    an analog-to-digital converter (ADC) coupled with the pre-signal detector;
    a human voice detector coupled with the pre-signal detector and the ADC, wherein after the host system enters into the sleep mode, when the pre-signal detector outputs the first wake-up command, the ADC is woken up to transform the analog audio signal into a digital audio signal, the human voice detector is woken up to determine if the digital audio signal satisfies a human voice, and when the digital audio signal is determined to satisfy the human voice, the human voice detector outputs a second wake-up command; and
    a digital signal processor (DSP) coupled with the human voice detector, wherein after the host system enters into the sleep mode, when the human voice detector outputs the second wake-up command, the DSP is woken up to determine if the human voice satisfies the predetermined key-phrase, and when the human voice is determined to satisfy the predetermined key-phrase, the DSP outputs the host wake-up command to wake up the host system from the sleep mode.

3. The electronic device according to claim 2, wherein when the host system of the electronic device enters into the sleep mode from an operation mode, the ADC, the human voice detector and the DSP enter into the sleep mode together.

4. The electronic device according to claim 3, wherein after the host system enters into the sleep mode, and under the situation that the human voice detector and the ADC are woken up, when the digital audio signal is determined not to satisfy the human voice, the human voice detector and the ADC return back to the sleep mode and wait for a next wakeup.

5. The electronic device according to claim 3, wherein after the host system enters into the sleep mode, and under the situation that the DSP, the human voice detector and the ADC are woken up, when the human voice is determined not to satisfy the predetermined key-phrase, the DSP, the human voice detector and the ADC return back to the sleep mode and wait for a next wakeup.

6. The electronic device according to claim 1, wherein determining if the analog audio signal satisfies the predetermined condition is to determine if the analog audio signal satisfies a predetermined pattern, wherein the predetermined pattern is set by a physical property of the human voice or a physical property of the predetermined key-phrase.

7. The electronic device according to claim 3, wherein the key-phrase determination circuit further includes:
    a second microphone pre-amplifier coupled between the microphone, the pre-signal detector and the ADC, wherein after the host system enters into the sleep mode, when the pre-signal detector outputs the first wake-up command, the second microphone pre-amplifier is woken up to amplify the ambient audio signal to output the analog audio signal to the ADC.

8. The electronic device according to claim 7, wherein when the host system of the electronic device enters into the sleep mode from the operation mode, the second microphone pre-amplifier enters into the sleep mode together.

9. The electronic device according to claim 8, wherein after the host system enters into the sleep mode, and under the situation that the second microphone pre-amplifier, the human voice detector and the ADC are woken up, when the digital audio signal is determined not to satisfy the human voice detector, the second microphone pre-amplifier returns back to the sleep mode and waits for a next wakeup.

10. The electronic device according to claim 9, wherein a power consumption of the second microphone pre-amplifier when under operation is greater than a power consumption of the first microphone pre-amplifier when under operation.

11. An operation method for an electronic device with a wake on voice function, wherein the electronic device includes a host system, a microphone, a first microphone pre-amplifier, a pre-signal detector and a key-phrase determination circuit, the operation method comprising:
receiving an ambient sound, by the microphone, and outputting the ambient sound as an ambient audio signal;
receiving the ambient sound, by the first microphone pre-amplifier, to generate an analog audio signal;
receiving the analog audio signal, by the pre-signal detector, to determine if the analog audio signal satisfies a predetermined condition, wherein when the host system enters into a sleep mode and if the analog audio signal is determined to satisfy the predetermined condition, the pre-signal detector outputs a first wake-up command to wake up the key-phrase determination circuit; and
the key-phrase determination circuit being woken up to receive and process the analog audio signal so as to determine if the ambient sound satisfies a predetermined key-phrase, wherein when the ambient sound is determined to satisfy a predetermined key-phrase, the key-phrase determination circuit outputs a host wake-up command to wake up the host system from the sleep mode.

12. The operation method according to claim 11, wherein the key-phrase determination circuit includes an analog-to-digital converter (ADC), a human voice detector and a digital signal processor (DSP), wherein the operation method further includes:
after the host system enters into the sleep mode, when the pre-signal detector outputs the first wake-up command, the ADC is woken up to transform the analog audio signal into a digital audio signal, the human voice detector is woken up to determine if the digital audio signal satisfies a human voice, and when the digital audio signal is determined to satisfy the human voice, the human voice detector outputs a second wake-up command to wake the DSP up; and
the DSP being woken up to determine if the human voice satisfies the predetermined key-phrase, and when the human voice is determined to satisfy the predetermined key-phrase, the DSP outputting the host wake-up command to wake up the host system from the sleep mode.

13. The operation method according to claim 12, wherein when the host system of the electronic device enters into the sleep mode from an operation mode, the ADC, the human voice detector and the DSP enter into the sleep mode together.

14. The operation method according to claim 13, wherein after the host system enters into the sleep mode, and under the situation that the human voice detector and the ADC are woken up, when the digital audio signal is determined not to satisfy the human voice, the human voice detector and the ADC return back to the sleep mode and wait for a next wakeup.

15. The operation method according to claim 13, wherein after the host system enters into the sleep mode, and under the situation that the DSP, the human voice detector and the ADC are woken up, when the human voice is determined not to satisfy the predetermined key-phrase, the DSP, the human voice detector and the ADC return back to the sleep mode and wait for a next wakeup.

16. The operation method according to claim 11, wherein determining if the analog audio signal satisfies the predetermined condition is to determine if the analog audio signal satisfies a predetermined pattern, wherein the predetermined pattern is set by a physical property of the human voice or a physical property of the predetermined key-phrase.

17. The operation method according to claim 13, wherein the key-phrase determination circuit further includes a second microphone pre-amplifier, wherein the operation method further includes:
after the host system enters into the sleep mode, when the pre-signal detector outputs the first wake-up command, the second microphone pre-amplifier being woken up to amplify the ambient audio signal, and to output the analog audio signal to the ADC.

18. The operation method according to claim 17, wherein when the host system of the electronic device enters into the sleep mode from the operation mode, the second microphone pre-amplifier enters into the sleep mode together.

19. The operation method according to claim 18, wherein after the host system enters into the sleep mode, and under the situation that the second microphone pre-amplifier, the human voice detector and the ADC are woken up, when the digital audio signal is determined not to satisfy the human voice, the second microphone pre-amplifier returns back to the sleep mode and waits for a next wakeup.

20. The operation method according to claim 19, wherein a power consumption of the second microphone pre-amplifier when under operation is greater than a power consumption of the first microphone pre-amplifier when under operation.

* * * * *